(12) United States Patent
Maxwell et al.

(10) Patent No.: US 6,379,452 B1
(45) Date of Patent: Apr. 30, 2002

(54) CALCINED KAOLIN CLAY PIGMENTS HAVING IMPROVED COLOR AND PROCESS FOR THE MANUFACTURE THEREOF

(75) Inventors: Chris B. Maxwell, Evans; Zhenzhong Zhang, Athens, both of GA (US); Haydn H. Murray, Bloomington, IN (US)

(73) Assignee: Thiele Kaolin Company, Sandersville, GA (US)

( * ) Notice: Subject to any disclaimer, the term of this patent is extended or adjusted under 35 U.S.C. 154(b) by 0 days.

(21) Appl. No.: 09/533,508

(22) Filed: Mar. 23, 2000

(51) Int. Cl.⁷ .................................................. C09C 1/42

(52) U.S. Cl. ........................ 106/486; 106/408; 106/442; 106/446; 106/458; 106/480; 106/484

(58) Field of Search ................................. 106/408, 410, 106/414, 442, 446, 458, 480, 486, 484

(56) References Cited

U.S. PATENT DOCUMENTS

| | | | |
|---|---|---|---|
| 3,586,523 A | | 6/1971 | Fanselow et al. |
| 4,246,039 A | * | 1/1981 | Mixon, Jr. .................. 106/484 |
| 4,578,118 A | | 3/1986 | Huege et al. |
| 4,661,164 A | | 4/1987 | Severinghaus, Jr. |
| 5,011,534 A | * | 4/1991 | Berbue et al. .............. 106/486 |
| 5,106,420 A | * | 4/1992 | Marshall, Jr. ............... 106/499 |
| 5,106,421 A | * | 4/1992 | Marshall, Jr. et al. ...... 106/499 |
| 5,154,766 A | | 10/1992 | Young |
| 5,587,011 A | | 12/1996 | Marshall et al. |
| 5,624,488 A | | 4/1997 | Forbus et al. |
| 5,667,639 A | | 9/1997 | Marshall et al. |
| 5,846,382 A | | 12/1998 | von Raven |

* cited by examiner

Primary Examiner—Michael Marcheschi
(74) Attorney, Agent, or Firm—Baker, Donelson, Bearman & Caldwell

(57) ABSTRACT

Calcined kaolin clay pigments having improved color are manufactured by adding a blue agent to the kaolin clay pigment prior to calcination, and then calcining the pigment and blue agent mixture.

5 Claims, No Drawings

CALCINED KAOLIN CLAY PIGMENTS HAVING IMPROVED COLOR AND PROCESS FOR THE MANUFACTURE THEREOF

TECHNICAL FIELD

This invention relates to calcined kaolin clay pigments. In a more specific aspect, this invention relates to calcined kaolin clay pigments having improved color. This invention also relates to a process for the manufacture of these pigments.

BACKGROUND OF THE INVENTION

Kaolin is a naturally occurring, relatively fine, white clay mineral which may be generally described as a hydrated aluminum silicate. After beneficiation, kaolin is widely used as a filler and pigment in various materials, such as rubber and resins, and in various coatings, such as paints and coatings for paper.

The use of kaolin in paper coatings serves, for example, to improve brightness, color, gloss, smoothness, opacity, printability and uniformity of appearance of the coated paper. As a filler in paper formulations, kaolin is used to extend fiber and reduce cost, and to improve opacity, brightness and other desirable characteristics of the filled paper product.

Calcined kaolin is a particular type of kaolin and is often used in large quantities for paper manufacture. Calcined kaolin can be obtained by heating beneficiated kaolin clay at temperatures of at least 550° C. The calcination step dehydroxylates and converts the kaolin into a noncrystalline aluminosilicate phase or metakaolin. The term "dehydroxylates" refers to the removal of structural hydroxyl groups from the kaolin in the form of water vapor. The particles of the feed clay are aggregated by calcination. The particle aggregation increases the light scattering characteristics of the kaolin (as compared to non-calcined kaolin) and, therefore, contributes a high degree of opacity to the coated paper. In addition, calcination increases the brightness of the kaolin.

Fanselow et al. U.S. Pat. No. 3,586,523 describes calcined kaolin clays.

Calcined kaolin clay pigments (such as those marketed by Thiele Kaolin Company of Sandersville, Georgia under the trademark KAOCAL) are widely used in the paper industry. The high brightness of the calcined clay is partly due to the removal of organic material at elevated temperatures. The brightness can also be improved through pre-calcination beneficiation processes such as magnetic separation, froth flotation, selective flocculation and chemical leaching.

For example, Forbus et al. U.S. Pat. No. 5,624,488 describes the method of floating, grinding, classifying and calcining Middle Georgia kaolin to produce ultrahigh brightness (96%+) calcined clay pigments. Removal of yellow tinted iron oxides, titania and organic matter helps increase the brightness and whiteness of the kaolin, and decreases the yellowness as indicated by a reduction of the Hunter b-value.

With regard to Hunter b-value, a positive b-value indicates yellow, whereas a negative b-value indicates blue. A lower b-value (near zero or negative) provides an optically enhanced and more desirable pigment color.

Though removal of discoloring impurities from the kaolin decreases the yellowness or Hunter b-value of the calcined kaolin pigment, many paper coating operations still must add optical whiteners to their coating formulations to further enhance the color of the coated paper.

The prior art discloses that the addition of a blue agent to kaolin and other mineral pigments can reduce the yellowness and increase the whiteness of the pigment, which carries over into the coating color formulation. Severinghaus U.S. Pat. No. 4,661,164 discloses that intermixing a blue pigment or dye with a mineral filler (such as calcium carbonate, kaolin, talc, feldspar, etc.) would increase the whiteness of the pigment. The blue agent preferred by Severinghaus is ultramarine blue, although cobalt aluminate, cobalt blue, iron blue, titanium blue, phthalocyanine blue and others are also disclosed as effective. This patent is focused on adding the blue agent directly to the mineral filler. For calcium carbonate, the blue agent addition would preferably occur during the grinding stage.

Young U.S. Pat. No. 5,154,766 blends a small amount of discrete iron oxide, as magnetite, with hydrous kaolin clays to decrease the yellowness of the pigment. The b-value is decreased, but the pigment brightness is significantly reduced as a result of the iron oxide addition.

Marshall et al. U.S. Pat. Nos. 5,587,011 and 5,667,639 disclose that the whiteness of clay materials is increased by adding cationic organic dyes. The dyes are added after the final beneficiation stage of hydrous kaolin processing (leaching/filtration) to make optically whitened pigments.

Von Raven U.S. Pat. No. 5,846,382 teaches the use of photoactivators of sulfonated zinc, manganese or aluminum phthalocyanines. The photosensitizing compounds are added to enhance the whiteness, brightness and chromaticity of inorganic fillers and pigments.

Each of the above prior art methods for improving the whiteness of hydrous kaolin pigments involves the addition of blue pigments or dyes to hydrous kaolin itself, or to paper coating formulations containing kaolin. In most cases, the resultant pigment is a simple physical mixture in which the blue agent can be subject to separation or segregation from the kaolin. In addition, organic pigments would burnout at elevated temperatures. Many inorganic pigments would undergo phase changes at elevated temperatures, and these changes could dramatically alter the color of such pigments.

Huege et al. U.S. Pat. No. 4,578,118, discloses a method for increasing the brightness of a calcined clay through the addition of an alumina source to the clay, then calcining the mixture. The brightness improvement shown by this patent for the calcined kaolin alumina blend is greater than the brightness improvement seen in a process that blends an alumina source and a previously calcined kaolin.

There is no method in the prior art for decreasing the yellowness and improving the whiteness of a calcined kaolin by adding a blue agent that overcomes the limitations of the prior art which are discussed above. The demand for calcined kaolin in paper making applications is increasing, as is the demand for these calcined kaolin products to be less yellow. In view of the foregoing discussion, there is a need in the industry for a calcined kaolin clay pigment having improved color (i.e., reduced yellowness and increased whiteness).

SUMMARY OF THE INVENTION

Briefly described, the present invention provides a calcined kaolin clay pigment which has improved color. The present invention also provides a process by which a blue agent is added to kaolin clay prior to calcination to produce a pigment having improved color.

As used in this application, the term "improved color" refers to reduced yellowness (as indicated by the Hunter b-value) and increased whiteness of the calcined kaolin clay pigment when compared to an equivalent calcined kaolin clay pigment which does not contain a blue agent.

We believe that, because the blue agent is calcined in conjunction with the kaolin clay, the blue agent becomes incorporated within the aggregates of the calcined kaolin clay. As the blue agent is permanently bound to the kaolin clay aggregates, the resulting pigment is not a physical mixture. Consequently, a significant advantage of this invention over the prior art is the reduced possibility for separation or segregation of the blue agent from the calcined kaolin clay pigment.

Accordingly, an object of this invention is to provide a calcined kaolin clay pigment.

Another object of this invention is to provide a calcined kaolin clay pigment having improved color.

Another object of this invention is to provide a calcined kaolin clay pigment having reduced yellowness.

Another object of this invention is to provide a calcined kaolin clay pigment having increased whiteness.

Another object of this invention is to provide a calcined kaolin clay pigment containing blue agent which has been added prior to calcination.

Another object of this invention is to provide a calcined kaolin clay pigment having a blue agent incorporated within the aggregates of the calcined kaolin clay pigment.

Another object of this invention is to provide a calcined kaolin clay pigment having a blue agent permanently bound to the aggregates of the calcined kaolin clay pigment.

Still another object of this invention is to provide a process for the manufacture of a calcined kaolin clay pigment.

Still another object of this invention is to provide a process for the manufacture of a calcined kaolin clay pigment having improved color.

Still another object of this invention is to provide a process for the manufacture of a calcined kaolin clay pigment having reduced yellowness.

Still another object of this invention is to provide a process for the manufacture of a calcined kaolin clay pigment having increased whiteness.

Still another object of this invention is to provide a process for the manufacture of a calcined kaolin clay pigment in which a blue agent is added to the kaolin clay prior to calcination.

Still another object of this invention is to provide a process for the manufacture of a calcined kaolin clay pigment in which a blue agent is incorporated into the aggregates of the calcined kaolin clay pigment.

Still another object of this invention is to provide a process for the manufacture of a calcined kaolin clay pigment in which a blue agent is permanently bound to the aggregates of the kaolin clay pigment.

These and other objects, features and advantages of this invention will become apparent from the following detailed description.

DETAILED DESCRIPTION OF THE INVENTION

The present invention relates to a calcined kaolin clay pigment having improved color (i.e., reduced yellowness and increased whiteness), wherein the color is improved by the presence of a blue agent within the aggregates of the calcined kaolin clay pigment. In this invention, the blue agent is added to the kaolin clay pigment prior to calcination, which results in the kaolin clay pigment and the blue agent being calcined together.

The present invention also relates to process for the manufacture of a calcined kaolin clay pigment having improved color, wherein the process comprises the sequential steps of (A) obtaining a beneficiated, uncalcined kaolin clay pigment starting material; (B) forming an aqueous slurry of the pigment starting material; (C) adding a blue agent to the aqueous slurry; (D) spray drying the aqueous slurry and then pulverizing the spray dried product; and (E) calcining the pulverized product at a temperature of at least 550° C. to obtain a calcined kaolin clay pigment having improved color when compared to the beneficiated, calcined kaolin clay pigment from the same starting material, but without addition of a blue agent.

In accordance with the present invention, calcined kaolin pigments are prepared with decreased yellowness and increased whiteness. A blue agent is added to hydrous kaolin clay prior to calcination. The mixture is then calcined at temperatures sufficiently high enough to dehydroxylate the kaolin or to form what is referred to as "metakaolin". Temperatures may also be sufficiently high enough to surpass the kaolin "exotherm" and create "fully calcined" kaolin. The resultant products have decreased yellowness and increased whiteness compared to an equivalent calcined kaolin but without the blue agent.

The preferred kaolins for this invention are a classified Tertiary kaolin, a classified Cretaceous kaolin and blends of the two. Beneficiation processes including flotation, selective flocculation, magnetic separation, delamination and leaching can be performed on the starting kaolin materials to enhance the purity of the final products.

An example of a kaolin that could be utilized for this invention includes a Tertiary grey clay. The clay is blunged, degritted and classified. The classified clay is passed through a high gradient magnetic separator, flocculated, filtered, redispersed, spray dried, pulverized and calcined.

Another kaolin that could be utilized for this invention includes a Cretaceous kaolin clay. The clay is blunged, floated and classified. The classified clay is passed through a magnetic separator, leached, filtered, redispersed, spray dried, pulverized and calcined.

Blends of a classified Tertiary kaolin and a classified Cretaceous kaolin can also be used in this invention. These blends could be beneficiated as described above.

Examples of blue agents which are effective in this invention include cobalt aluminate, cobalt silicate aluminate, iron blue and titanium blue. The preferred blue agent is cobalt aluminate.

The amount of blue agent used in this invention can vary depending upon many factors, such as the specific kaolin clay starting material, the desired characteristics of the final pigment product, etc. In general, the amount of blue agent will be in the range of about 0.01 to about 0.5 percent, based on the weight of the kaolin clay. An amount of blue agent within this range will serve to reduce the Hunter b-value of the final pigment product by at least 0.2 units. The preferred amount of blue agent is about 0.025 to about 0.1 percent.

The blue agent used in this invention must survive the calcination temperatures of this process. Organic pigments would burnout at elevated temperatures, and many inorganic pigments can undergo high temperature phase changes which can dramatically alter their color or other important properties.

The blue agent can be added at various stages of this process, and preferably will be added to an aqueous slurry of the kaolin clay starting material. Alternatively, the blue agent in dry or slurry form could be added to a spray dried kaolin clay. An essential feature of this invention is addition of the blue agent to the kaolin clay prior to calcination.

The blue agent could be added to the kaolin processing stream as early as the initial blunging step. Because of the desire not to lose material through processing, a more practical addition of the blue agent is after filtration, prior to spray drying. The mixture of the blue agent and the kaolin clay is then dried, pulverized and calcined to provide a calcined kaolin pigment with reduced yellowness and increased whiteness.

The characteristics used to determine the effectiveness of the invention are pigment brightness, whiteness and Hunter b-value (an indication of yellowness). Brightness measurements are detailed in TAPPI method T-646, "Brightness of Clay and Other Mineral Pigments (45°/0°)". Whiteness is measured according to TAPPI method T-562, "CIE Whiteness and Tint of Paper and Paperboard (Using 45°/0° Directional Illumination and Viewing)". The Hunter b-value is determined as described in TAPPI method T-524, "Color of Paper and Paperboard (45°/0° Geometry)". As stated earlier, a positive (+) b-value indicates yellowness, and a negative (−) b-value indicates blueness. A pressed plaque of pulverized kaolin is used for the measurement specimen according to TAPPI method T-646. TAPPI methods T-562 and T-524 were modified to use pressed plaques also. All parameters are measured using the Technidyne Brightimeter Micro S-5.

The present invention is further illustrated by the following examples which are illustrative of certain embodiments designed to teach those of ordinary skill in the art how to practice this invention and to represent the best mode contemplated for carrying out this invention.

EXAMPLE 1

A Tertiary kaolin clay is mined, blunged and classified. The slurry is passed through a magnetic separator, flocculated, filtered and redispersed. The redispered slurry is spray dried, pulverized, calcined at 990° C. for 35 minutes, and pulverized a second time. The brightness and color are measured and shown in Table I.

EXAMPLE 2

A Tertiary kaolin clay is mined, blunged and classified. The slurry is passed through a magnetic separator, flocculated, filtered and redispersed. Cobalt aluminate is added to the redispersed slurry at a dosage level of 0.025%, based on the weight of the kaolin clay. The redispersed slurry containing the cobalt aluminate is spray dried, pulverized, calcined at 990° C. for 35 minutes and pulverized a second time. The brightness and color are measured and shown in Table I.

EXAMPLE 3

The procedure of Example 2 is followed, except that the cobalt aluminate dosage level is 0.1%.

TABLE I

|  | Brightness | Whiteness | b-value |
| --- | --- | --- | --- |
| Example 1 | 92.7 | 81.3 | 2.6 |
| Example 2 | 92.8 | 84.8 | 1.7 |
| Example 3 | 92.7 | 91.0 | 0.2 |

The data in Table I clearly shows that, with the addition of a blue agent, the pigments of Examples 2 and 3 have reduced yellowness and increased whiteness when compared to Example 1 (no blue agent).

EXAMPLE 4

A Cretaceous Middle Georgia kaolin clay is mined, blunged, floated and classified. The slurry is passed through a magnetic separator, flocculated, leached, filtered and redispersed. The redispersed slurry is spray dried, pulverized, calcined at 980° C. for 30 minutes and pulverized a second time. The brightness and color are measured and shown in Table II.

EXAMPLE 5

A Cretaceous Middle Georgia kaolin clay is mined, blunged, floated and classified. The slurry is passed through a magnetic separator, flocculated, leached, filtered and redispersed. Cobalt aluminate is added to the redispersed slurry in a dosage level of 0.025%, based on the weight of the kaolin clay. The redispersed slurry containing the cobalt aluminate is spray dried, pulverized, calcined at 980° C. for 30 minutes and pulverized a second time. The brightness and color are measured and shown in Table II.

EXAMPLE 6

The procedure of Example 5 is followed, except that the cobalt aluminate dosage level is 0.1%.

TABLE II

|  | Brightness | Whiteness | b-value |
| --- | --- | --- | --- |
| Example 4 | 96.0 | 89.3 | 1.4 |
| Example 5 | 96.2 | 93.7 | 0.4 |
| Example 6 | 95.9 | 100.7 | −1.4 |

Again, the data in Table II clearly shows that, with the addition of a blue agent, Examples 5 and 6 have reduced yellowness and increased whiteness when compared to Example 4 (no blue agent).

This invention has been described in detail with particular reference to certain embodiments, but variations and modifications can be made without departing from the spirit and scope of the invention as defined in the following claims.

What is claimed is:

1. A process for improving the color of a calcined kaolin clay pigment, wherein the process comprises the sequential steps of:

A. obtaining a beneficiated, uncalcined kaolin clay pigment starting material;

B. forming an aqueous slurry of the pigment starting material;

C. adding a blue agent to the aqueous slurry;

D. spray drying the aqueous slurry and then pulverizing the spray dried product; and E. calcining the pulverized product at a temperature of at least 550° C. to obtain a calcined pigment having improved color when compared to the color of a beneficiated, calcined kaolin clay pigment from the same starting material but without addition of a blue agent.

2. A process as defined by claim 1 wherein the blue agent is added in an amount of from about 0.01 to about 0.5 percent, based on the weight of the kaolin clay.

3. A process as defined by claim 1 wherein the blue agent is added in an amount of from about 0.025 to about 0.1 percent, based on the weight of the kaolin clay.

4. A process as defined by claim 1 wherein the blue agent is cobalt aluminate, cobalt silicate aluminate, iron blue, or titanium blue.

5. A process as defined by claim 4 wherein the blue agent is cobalt aluminate.

* * * * *